US006598760B1

(12) United States Patent
Wilson

(10) Patent No.: US 6,598,760 B1
(45) Date of Patent: Jul. 29, 2003

(54) DISPENSER

(75) Inventor: John Stuart Wilson, Gordon's Bay (ZA)

(73) Assignee: Thetis Engineering Development (Pty) Ltd., Woodstock (ZA)

( * ) Notice: Subject to any disclaimer, the term of this patent is extended or adjusted under 35 U.S.C. 154(b) by 0 days.

(21) Appl. No.: 09/868,327

(22) PCT Filed: Dec. 15, 1999

(86) PCT No.: PCT/IB99/02013

§ 371 (c)(1),
(2), (4) Date: Aug. 14, 2001

(87) PCT Pub. No.: WO00/38123

PCT Pub. Date: Jun. 29, 2000

(30) Foreign Application Priority Data

Dec. 18, 1998 (ZA) ........................................... 98/11658

(51) Int. Cl.[7] ............................................. B65G 59/00
(52) U.S. Cl. ......................................... 221/131; 312/45
(58) Field of Search ................................ 221/254, 303, 221/311, 312, 131, 92, 197, 287; 312/42, 45, 49; 198/402, 405

(56) References Cited

U.S. PATENT DOCUMENTS

| | | | | | |
|---|---|---|---|---|---|
| 1,689,256 | A | * | 10/1928 | Sapp | 221/131 |
| 1,908,596 | A | * | 5/1933 | Freimund et al. | 221/155 |
| 2,256,282 | A | | 9/1941 | Harris | |
| 2,525,261 | A | * | 10/1950 | Henderson | 312/49 |
| 2,852,327 | A | * | 9/1958 | Mason | 312/45 |
| 2,919,831 | A | | 1/1960 | Fry | |
| 3,306,688 | A | * | 2/1967 | Domenico | 312/42 |
| 3,870,135 | A | | 3/1975 | Allen | |
| 4,474,297 | A | * | 10/1984 | Zucker | 312/45 |
| 5,009,329 | A | * | 4/1991 | Farrentine | 312/45 |

FOREIGN PATENT DOCUMENTS

| | | |
|---|---|---|
| WO | WO 94/20908 | 9/1994 |

* cited by examiner

*Primary Examiner*—Kenneth W. Noland
(74) *Attorney, Agent, or Firm*—Pillsbury Winthrop LLP

(57) ABSTRACT

A dispenser for dispensing same-size discrete articles (P) comprises a holder (34, 36, 44) for holding a plurality of such articles in a stack, the holder having a top, a bottom (44, 46), and an exit opening (60) at the bottom, through which the lowermost article in the stack can leave the holder in a transverse direction. It further comprises means (38, 40, 16, 18) defining a pathway for guiding said articles from the exit opening to, and over, the top of the holder, with each article in the pathway pushing the article ahead of it along the pathway. The arrangement is such that the articles are visible while in transit along the pathway to the top of the holder.

11 Claims, 6 Drawing Sheets

DISPENSER

This application is the National Phase of International Application PCT/IB99/02013 filed Dec. 15, 1999 which designated the U.S. and that International Application.

This invention relates to a dispenser. More particularly, it relates to a dispenser for dispensing same-size discrete articles such as, for example, cigarette packs.

According to the invention there is provided a dispenser for dispensing same-size discrete articles, which comprises:

a holder for holding a plurality of such articles in a stack, the holder having a top, a bottom, and an exit opening at the bottom, through which the lowermost article in the stack can leave the holder in a transverse direction; and means defining a pathway for guiding said articles from the exit opening to a level higher than the exit opening, with each said article in the pathway pushing the article ahead of it along the pathway.

The pathway may be open or defined at least partly by walling of a transparent material, so as to render the articles visible while in transit from the exit opening to said higher level.

The pathway may extend from the exit opening to, and over, the top of the holder.

The dispenser may include a cassette, the cassette comprising a pair of spaced cheeks, and a plurality of connecting elements each spanning the distance between the cheeks and connecting the cheeks to one another, each cheek comprising a flat panel which forms the sides of said holder and of said pathway.

The holder may be formed by a wall which projects from the flat panel of each cheek towards the other cheek.

Said pathway may be formed by at least one wall which projects from the flat panel of each cheek towards the other cheek.

Said pathway may formed by a pair of spaced walls each projecting from the flat panel of each cheek towards the other cheek.

The bottom of said holder may be formed by a wall which projects from the flat panel of each cheek towards the other cheek.

The cheeks may be a mirror image of one another.

The cheeks may be injection moulded plastics components.

The connector elements may each be in the form of a length of tubing stock, the cheeks each having a plurality of integrally formed spigot formations thereon, and each spigot formation being a close fit in the end of a corresponding one of the connector elements.

The connector elements may each be in the form of a length of plastics tubing stock.

The dispenser may comprise a pair of spaced sides, a lower rail, and a pair of upper rails, the rails spanning the distance between the sides and connecting the sides together, and there being a gap between the upper rails, the cassette being arranged to extend between the upper and the lower rails, such that the gap between the upper rails forms the upper end of said pathway.

The rails may be aluminium extrusions.

The dispenser may comprise a plurality of said cassettes, the cassettes being arranged side-by-side in the space between the sides.

The invention will now be described in more detail, by way of example, with reference to the accompanying drawings.

Figure 1:
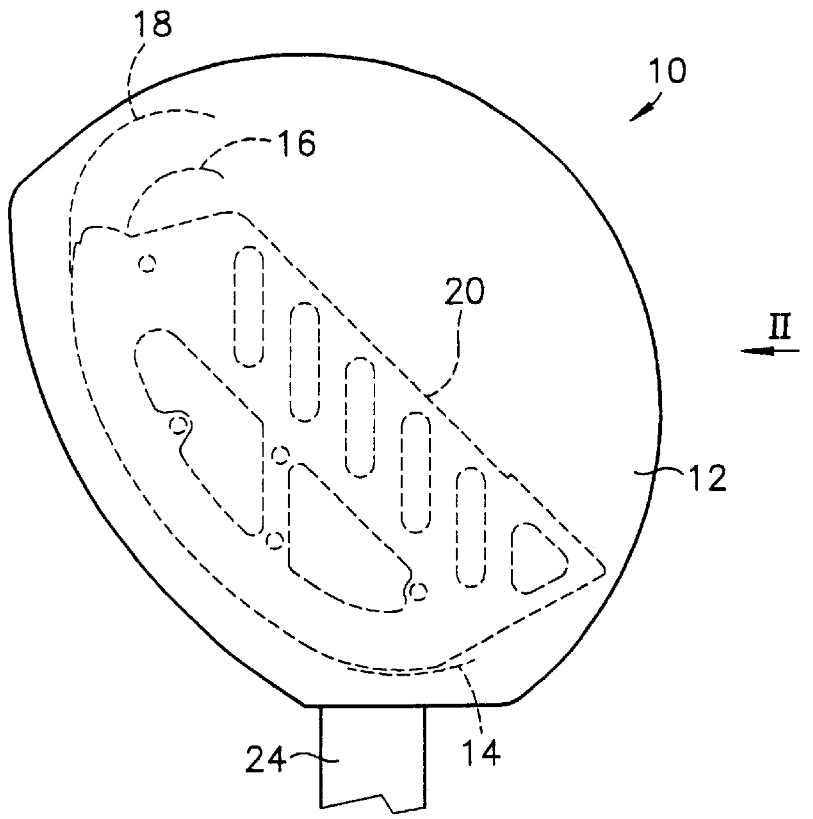
FIG. 1 is a side view of a dispenser in accordance with a first embodiment of the invention.
Figure 2:
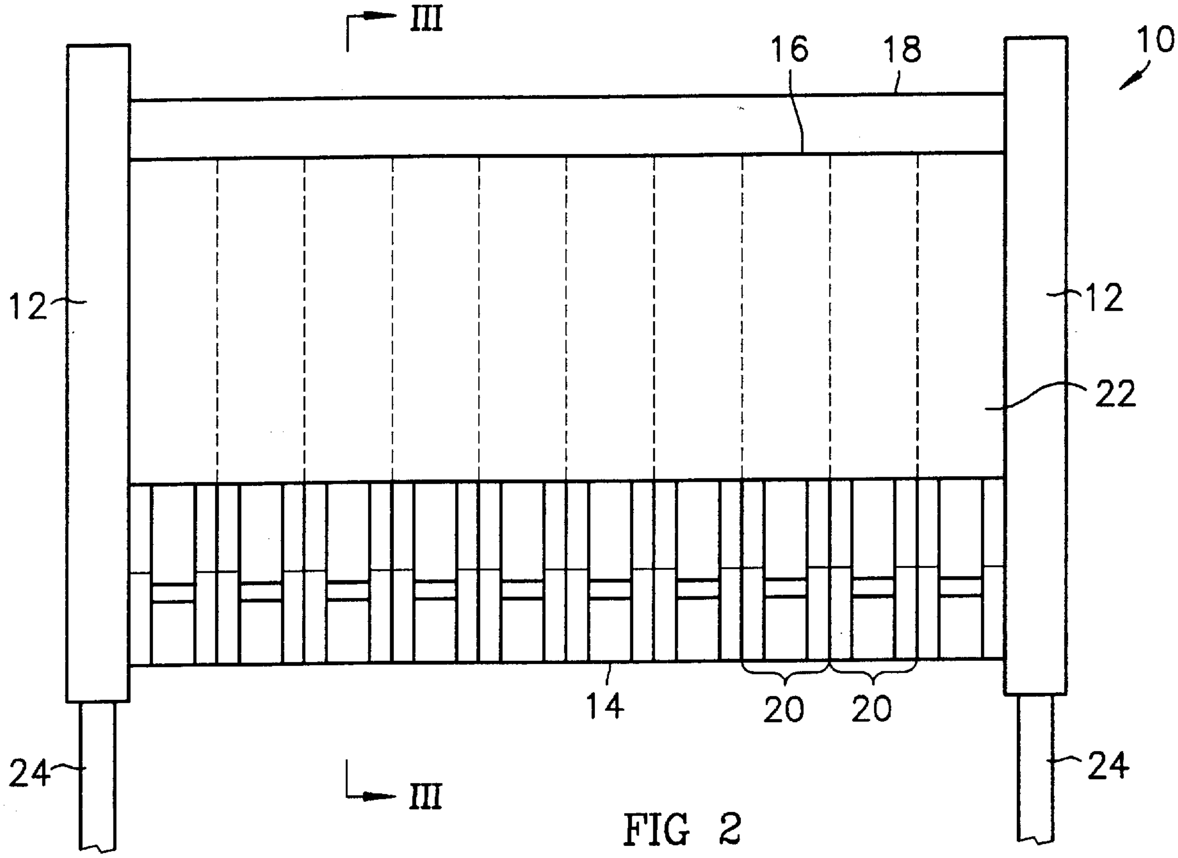
FIG. 2 is a rear view (in the direction of arrow 11 in FIG. 1) of the dispenser.

Referring first to FIGS. 1 to 10, reference numeral 10 generally indicates a dispenser which is of the type that can stand on a shop counter. That part of the dispenser that is on the left hand side of FIG. 1 will face a customer and will be referred to herein as the front of the dispenser, whereas the part that is on the right hand side of FIG. 1 will face the sales assistant and will be referred to herein as the rear of the dispenser.

The dispenser comprises a pair of sides 12, three rails 14, 16, and 18 which are fastened to, and extend between, the sides, a series of removable cassettes 20 which clip in position on the rails 14 and 16, and a lid 22. The dispenser also comprises a pedestal, only the legs 24 of which are shown.

The rails 14, 16, and 18 are aluminium extrusions, each having screw ports 26 for receiving the screws (not shown) that are used to fasten the sides 12 to the rails. The rails can be cut to any desired length, according to the number of cassettes 20 that it is desired to accommodate between the sides 12.

Each of the cassettes 20 comprises a pair of cheeks 28 which are connected to one another by means of connector elements 30. The cheeks 28 are injection moulded plastics components. There is a left hand cheek and a right hand cheek, the left hand and right hand cheeks being a mirror image of one another.

The connector elements 30 are in the form of short tubes which are cut from plastics tubing stock. The cheeks 28 have integrally formed spigot formations 32 (see FIG. 8), which are a close fit in the ends of the connector elements 30. If desired, an adhesive or ultrasonic welding may be used to secure the connector elements 30 to the spigot formations 32. The connector elements can be cut to any desired length, according to the width that it is desired the cassette 20 should have. The width of the cassette is chosen according to the width of the articles that are to be dispensed by the dispenser.

Each of the cheeks 28 comprises a flat panel 34 from which there project a straight wall 36 and a pair of curved walls 38 and 40. The curved wall 40 extends along the curved front edge of the panel 34. The curved wall 38 is set back from the curved wall 40, the two walls 38 and 40 forming between them a curved pathway along which articles P to be dispensed can be displaced from the bottom of the cassette to the top thereof. The panels 34 form the sides of the pathway. The straight wall 36 is spaced from and parallel to the rear edge of the panel 34 and, at the lower end thereof, meets up with the lower end of the curved wall 38.

Figure 3:
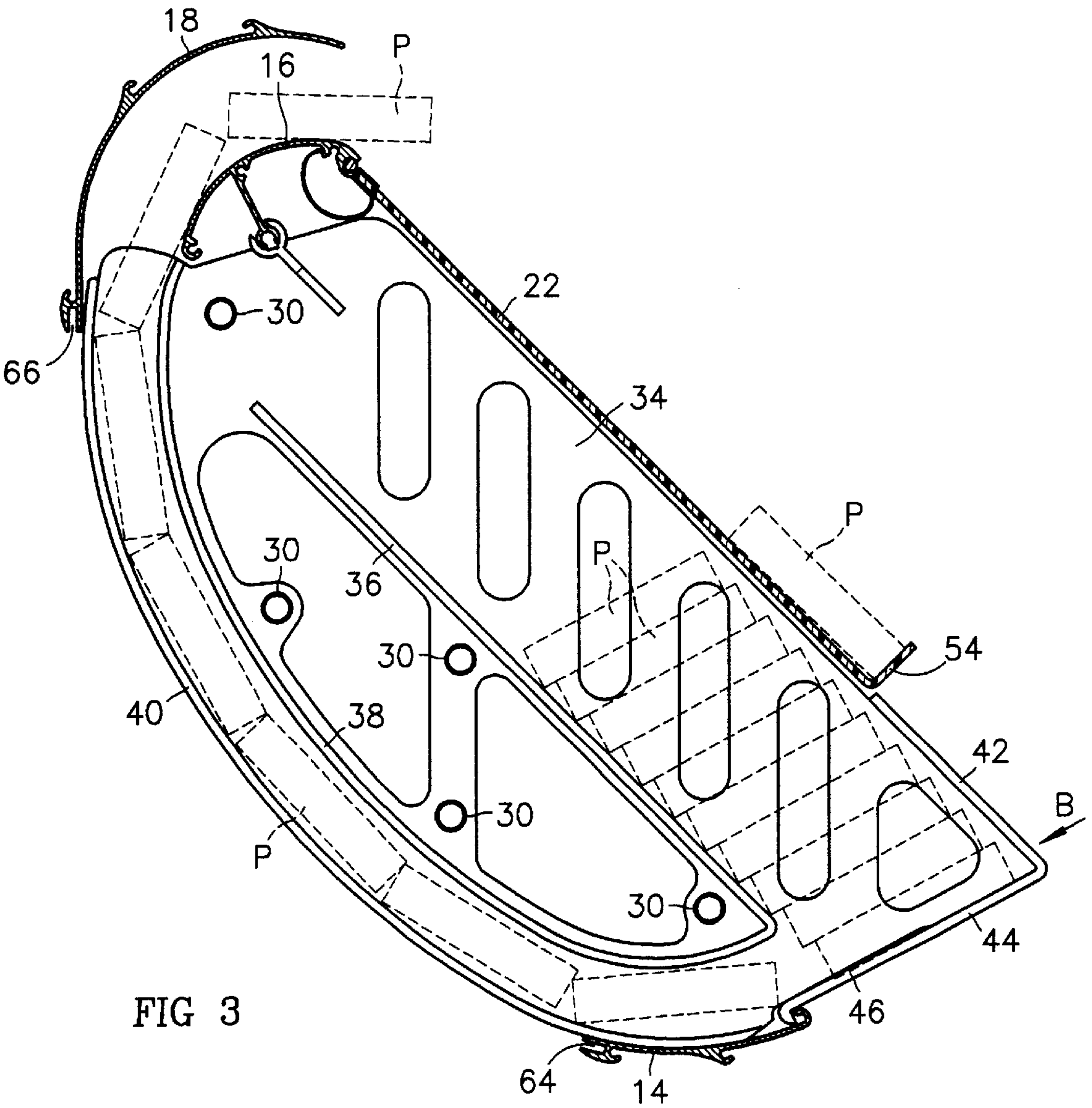
FIG. 3 is section in III—III in FIG. 2.
Figure 4:
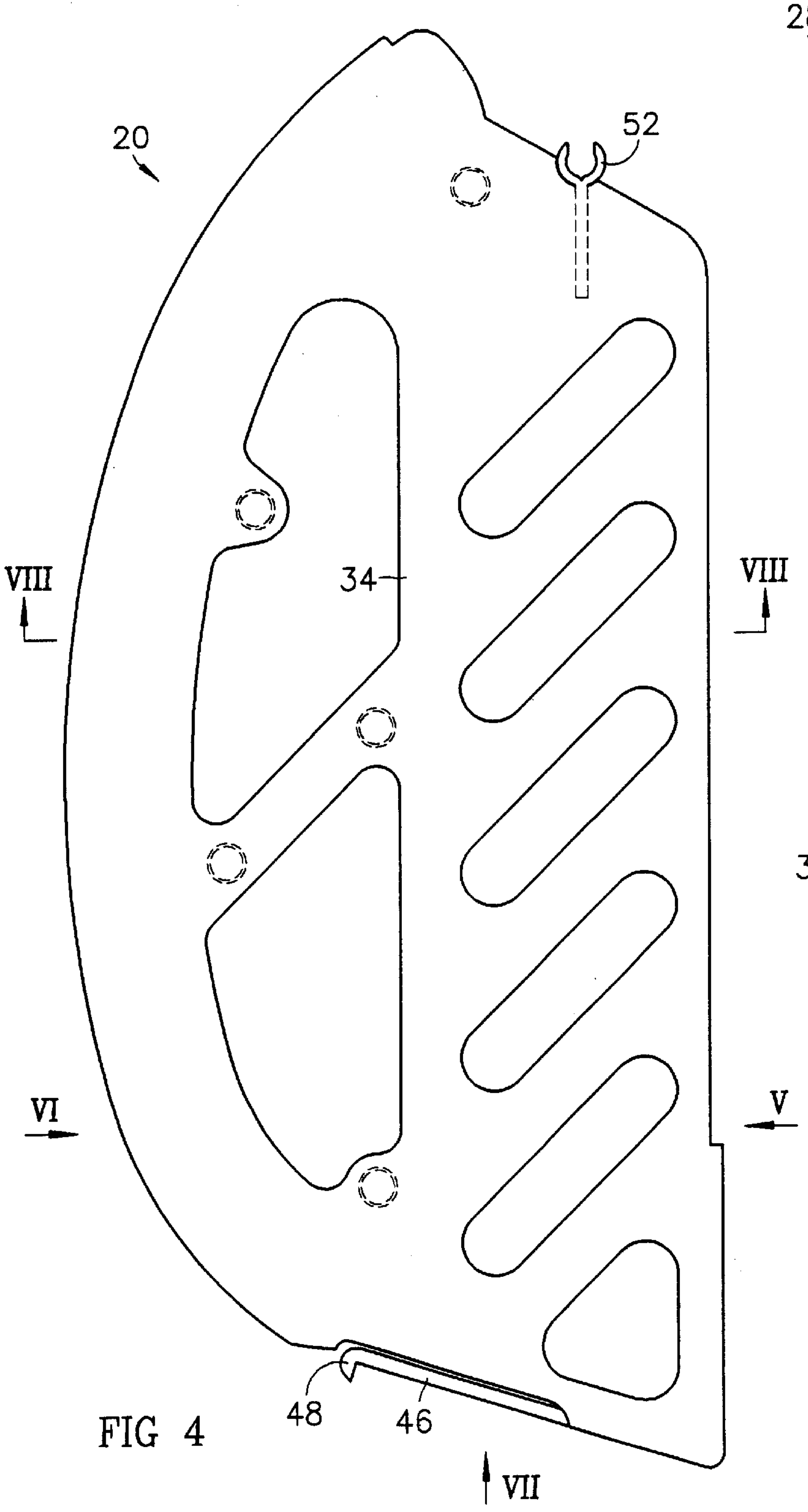
FIG. 4 is a side view of one of the cassettes forming part of the dispenser.
Figure 5:
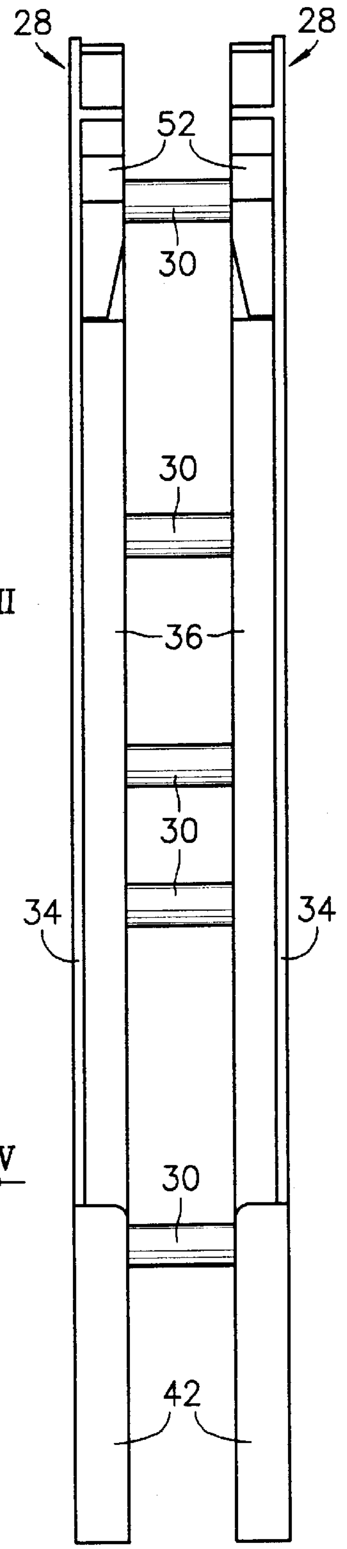
FIG. 5 is a rear view (in the direction of arrow V in FIG. 4) of the cassette.
Figure 6:
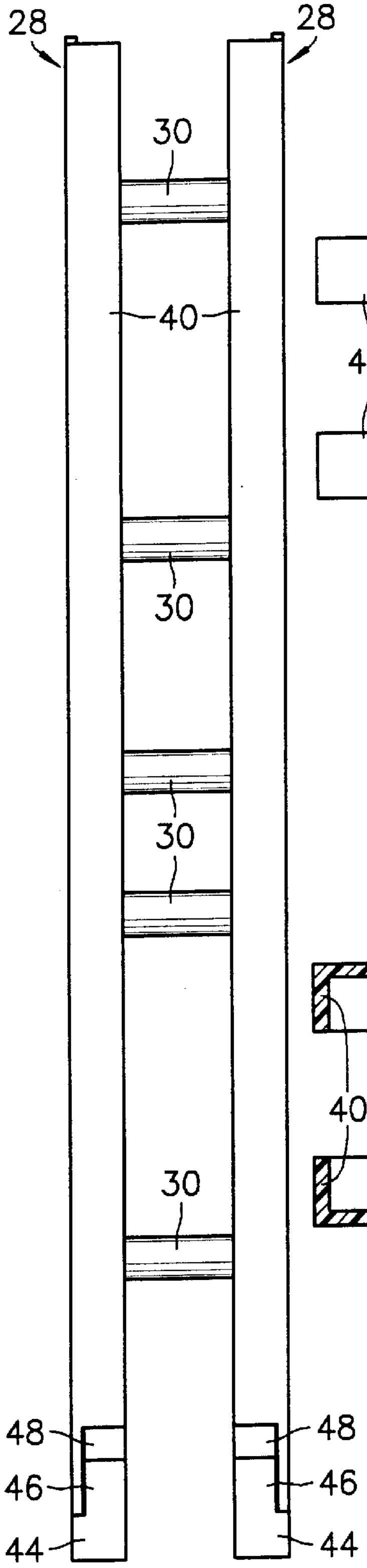
FIG. 6 is a front view (in the direction of VI in FIG. 4) of the cassette.
Figure 7:
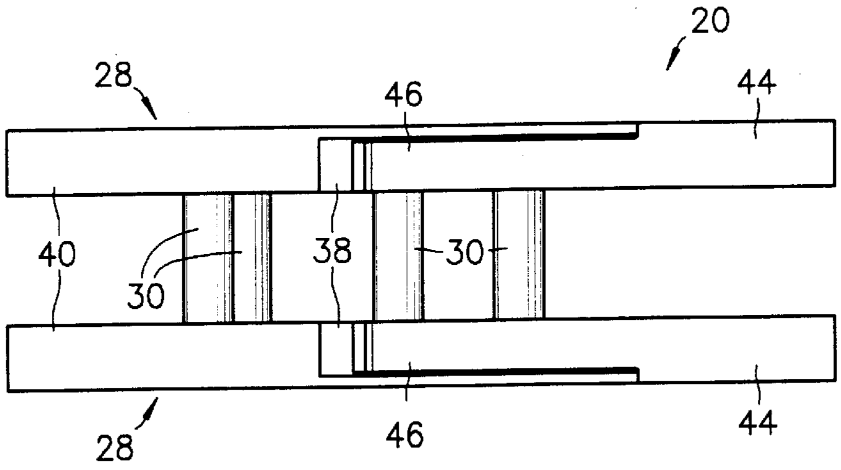
FIG. 7 is an underneath view (in the direction of arrow VII in FIG. 4) of the cassette.
Figure 8:
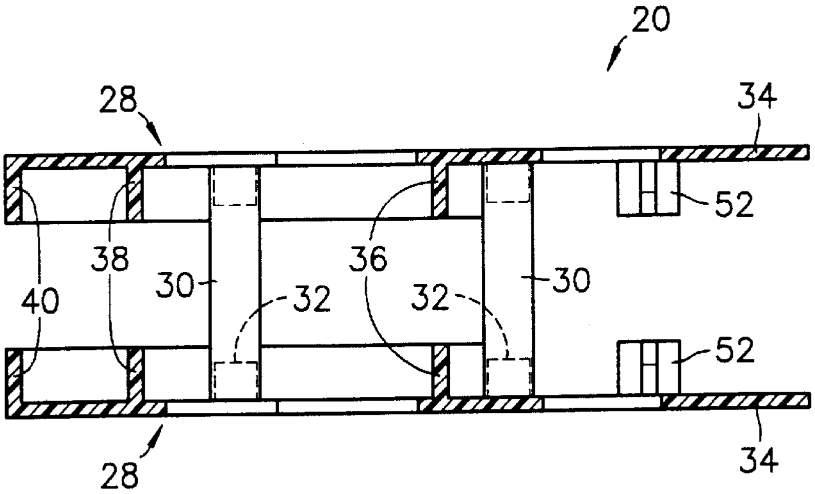
FIG. 8 is a section on VIII—VIII in FIG. 4.
Figure 9:
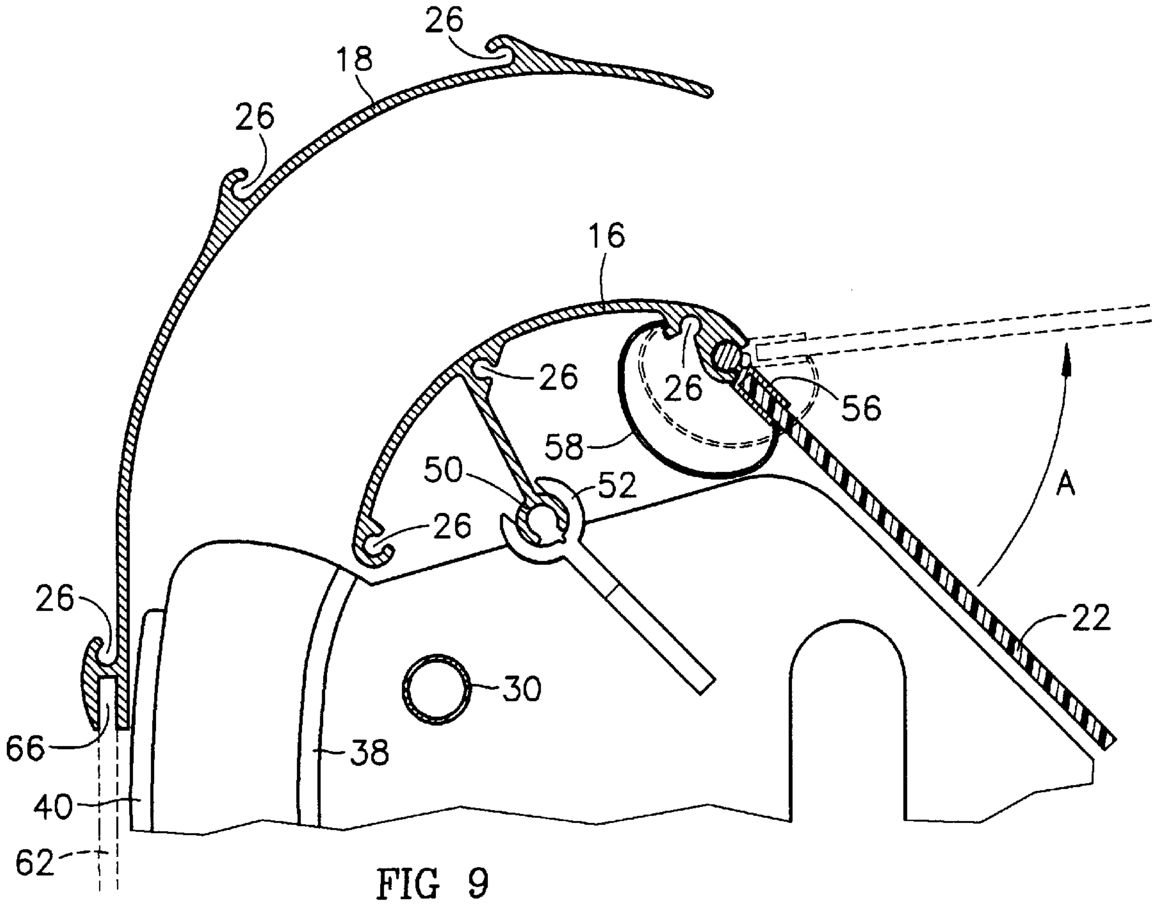
FIG. 9 is a detail of the upper part of FIG. 3, drawn to a larger scale.
Figure 10:
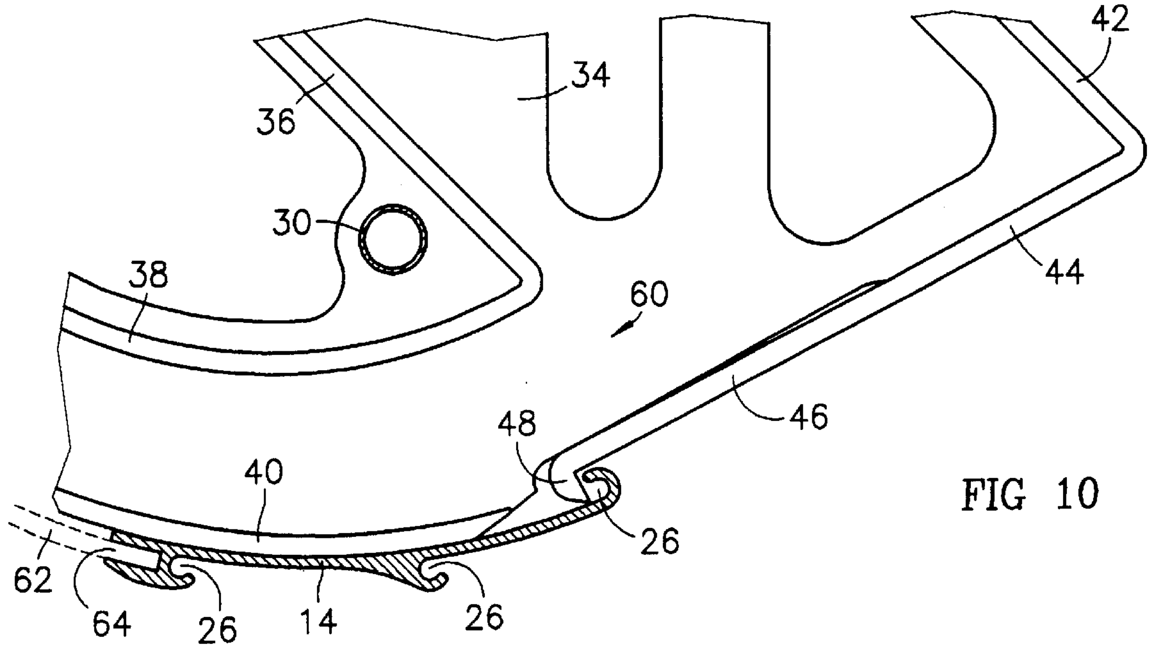
FIG. 10 is a detail of the lower part of FIG. 3, drawn to a larger scale.

Each cheek 38 further comprises, at the lower right hand corner as viewed in FIG. 3, a straight wall 42 and a bottom wall 44 which project from the panel 34. The straight wall 42 extends along the rear edge of the panel 34, for part only of the height of the panel, and the bottom wall 44 extends along the bottom edge of the panel, the two walls 42 and 44 meeting at the corner. A front portion of the bottom wall is separated from the panel 34, to form a resiliently flexible arm 46. The arm 46 has a hook formation 48 at the free end thereof. The bottom wall 44 and the arm 46 are approximately aligned with the lower end of the curved wall 40.

The rail 16 has a part 50 which forms a semi-cylindrical outer surface. Each of the cheeks 28 has, at the top thereof, an integrally formed clip formation 52 with a complementary semi-cylindrical inner surface. The clip formations 52 are able to clip onto the part 50. The clip formations 52 and the part 50, when engaged with one another, allow a certain degree of pivotal movement between the cassette 20 and the rail 16.

To place the cassette 20 in position, the clip formations 52 are first engaged with the part 50 and the cassette then pivoted downwardly, until the hook formations 48 engage with the rail 14. To remove the cassette 20, the hook formations 48 are first disengaged from the rail 14, whereupon the cassette can be unclipped from the part 50.

When the cassette 20 is in place, as illustrated in FIG. 3, the space between the rails 16 and 18 forms a continuation of the pathway defined by the walls 38 and 40.

The lid 22 extends across the width of the dispenser, between the two sides 12. Its lower edge is bent upwardly to form an upstanding lip 54. The lip 54 serves as a tray into which articles P which are dispensed will drop and from which they can then be retrieved.

Along its upper edge the lid 22 is provided with an aluminium extrusion 56. This cooperates with a corresponding formation on the rail 16, to form a hinge about which the lid can be displaced pivotally, as shown by the arrow A in FIG. 9. Between the lid and the rail 16 there is a C-shaped spring clip 58, for spring-loading the lid.

In use, same-size discrete articles, such as cigarette packs P, that are to be dispensed, are stacked into the cassette, the flat panels 34, the walls 36, and the walls 44 together forming a holder for holding the stack of packs. The walls 44 support the packs from below, and the walls 36 support them from behind.

In order to dispense an article P from the dispenser, the sales assistant, who will be behind the dispenser, will insert his or her finger into the gap between the walls 42 and push the lowermost pack P transversely from the stack through an exit opening 60, in the direction of arrow B. The lowermost pack will then enter into the gap between the walls 38 and 40 and, in so doing, push the packs already in the gap between the walls 38 and 40 upwardly. The uppermost pack P will move through the gap between the rails 16 and 18. From there it will slide along the upper surface of the lid 22 and, at the lower end of the lid, be caught by the lip 54. The pack P can then be retrieved from the lid and handed to the customer. For every pack that is pushed from the bottom of the stack through the exit opening 60 another pack is pushed through the gap between the rails 16 and 18. While the packs are in transit from the exit opening 60 to the top of the cassette, their major faces are visible from the front of the dispenser through the gap that there is between the cheeks 28, so that the customer can see what is being purchased. As a consequence, there is no need for there to be any promotional material on the dispenser itself. When the packs P are in the stack their major faces, which normally carry branding and other promotional material, are not visible to customers. The dispenser has the effect of presenting the packs, after having left the stack and while in transit along the pathway, in such a manner that the major faces of the packs are exposed to, and can be viewed by, customers.

If desired, the front of the dispenser may be closed by means of a flexible panel 62 of transparent material, the upper and lower edges of this panel being accommodated in slots 64 and 66 provided for this purpose in the rails 14 and 18 respectively. It is to be understood that this panel need not necessarily be of a transparent material. Thus, if it is not required for the packs P to be visible from the front of the dispenser, the panel may be of an opaque material and may, if desired, carry advertising material on the exposed face thereof.

Figure 11:
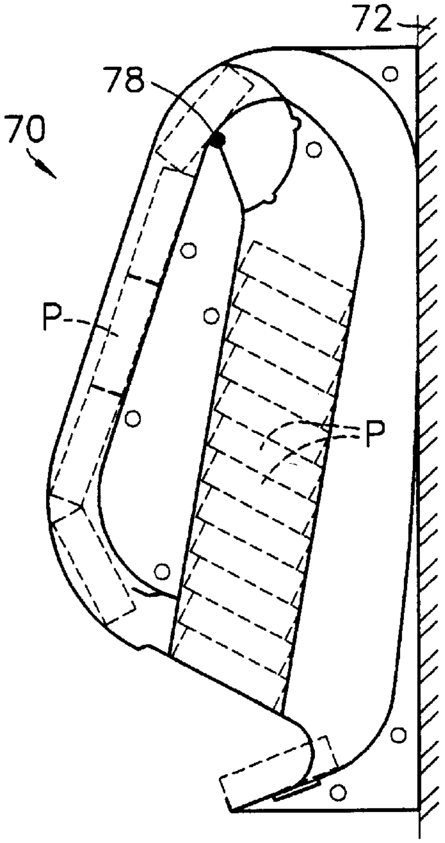
FIG. 11 is a diagrammatic section of a dispenser in accordance with a second embodiment of the invention, the dispenser being shown in the normal operating condition in which it is closed.
Figure 12:
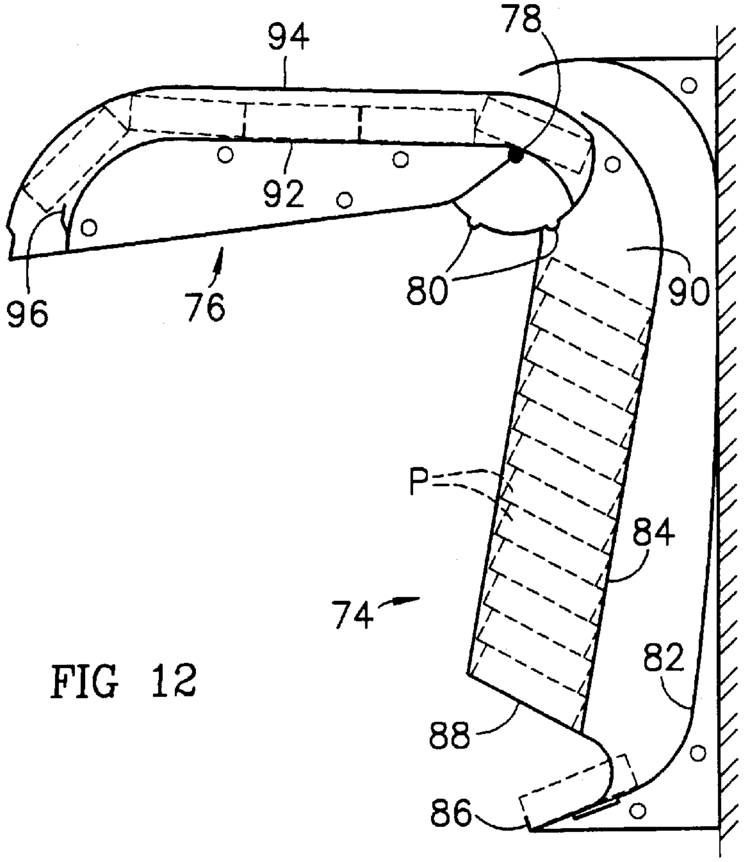
FIG. 12 is a view similar to FIG. 11, but showing the dispenser in the open condition, for purposes of reloading.

Referring now to FIGS. 11 and 12, reference numeral 70 generally indicates a dispenser which is of the wall mounted type, reference numeral 72 indicating a wall on which the dispenser is mounted. As in the case of the FIGS. 1 to 10 embodiment, the dispenser 70 has a series of cassettes arranged side-by-side, each holding a stack of same-size discrete articles P. The cassettes are each in two parts, namely a fixed part 74 and a pivotally displaceable part 76, the part 76 being pivotally displaceable with respect to the part 74 about a pivot axis at 78. Click stop formations 80 are provided to provide for click stop operation of the part 76.

The fixed part 74 has two rear walls 82 and 84, the rear wall 84 being spaced in front of the rear wall 82 and the two walls forming between them a chute down which the packs P can pass. At the lower and forward end of the rear wall 82 there is an upstanding lip 86, which forms a tray into which the packs that are dispensed drop and from where they can be retrieved.

The fixed part 74 further has a bottom wall 88 on which the packs P are stacked, to be between a pair of spaced side walls 90. The side walls 90, the rear wall 84, and the bottom wall form a holder for holding the stack of packs P. When the pivotal part 76 is in the position illustrated in FIG. 12, the holder is open at the front, so that packs P can be loaded into it.

The pivotal part 76 has a pair of curved walls 92 and 94, forming a curved pathway which leads from the bottom of the holder upwardly.

At the lower end of the rear wall 84 and in the bottom wall 88 there is a slot (not shown) into which a person can insert his or her finger to draw the lowermost pack P transversely from the stack and into the pathway between the walls 92 and 94. At least the wall 94 is of a transparent material, so as to render the packs P which are in transit along the pathway visible. A detent 96 is provided for preventing the packs which are in the pathway formed by the walls 92 and 94 from dropping out of the part 76 when the dispenser is opened.

In operation, a customer will withdraw the lowermost pack P from the stack by inserting his or her finger into the slot and pulling the lowermost pack in the stack forwardly. In so doing, the pack moves into the pathway formed by the walls 92 and 94, and pushes the packs ahead of it upwards along the pathway. For each pack P that is withdrawn from the bottom of the stack another pack is pushed out of the part 76 at the top, and drops down the chute towards the tray 86 at the bottom end of the rear wall 82.

What is claimed is:

1. A dispenser for dispensing same-size discrete articles, which comprises:

a holder for holding a plurality of such articles in a single upwardly extending stack, the holder having a top, a bottom, and an exit opening at the bottom, through which the lowermost article in the stack can leave the holder in a transverse direction; and means defining a pathway for guiding said articles from the exit opening to a level higher than the exit opening, with each said article in the pathway pushing the article ahead of it along the pathway, wherein the pathway curves from the exit opening to, and over, the top of the holder.

2. A dispenser as claimed in claim 1, which includes a cassette, the cassette comprising a pair of spaced cheeks, and a plurality of connecting elements each spanning the distance between the cheeks and connecting the cheeks to one another, each cheek comprising a flat panel which forms the sides of said holder and of said pathway.

3. A dispenser as claimed in claim 2, wherein the rear of the holder is formed by a wall which projects from the flat panel of each cheek towards the other cheek.

4. A dispenser as claimed in claim 2, wherein said pathway is formed by at least one wall which projects from the flat panel of each cheek towards the other cheek.

5. A dispenser as claimed in claim 4, wherein said pathway is formed by a pair of spaced walls each projecting from the flat panel of each cheek towards the other cheek.

6. A dispenser as claimed in claim 2, wherein the bottom of said holder is formed by a wall which projects from the flat panel of each cheek towards the other cheek.

7. A dispenser as claimed in claim 2, wherein the cheeks are a mirror image of one another.

8. A dispenser as claimed in claim 2, wherein the connector elements are each in the form of a length of tubing stock, the cheeks each having a plurality of integrally formed spigot formations thereon, and each spigot formation being a close fit in the end of a corresponding one of the connector elements.

9. A dispenser as claimed in claim 2, which further comprises a pair of spaced sides, a lower rail, and a pair of upper rails, the rails spanning the distance between the sides and connecting the sides together, and there being a gap between the upper rails, the cassette being arranged to extend between the upper and the lower rails, such that the gap between the upper rails forms the upper end of said pathway.

10. A dispenser as claimed in claim 9, wherein the rails are aluminum extrusions.

11. A dispenser as claimed in claim 9, which comprises a plurality of said cassettes, the cassettes being arranged side-by-side in the space between the sides.

* * * * *